US00RE42807E

(19) United States
(12) Reissued Patent
Harris

(10) Patent Number: US RE42,807 E
(45) Date of Reissued Patent: Oct. 4, 2011

(54) NON REAL TIME TRAFFIC SYSTEM FOR A NAVIGATOR

(76) Inventor: Scott C Harris, Rancho Santa Fe, CA (US)

(21) Appl. No.: 12/727,492

(22) Filed: Mar. 19, 2010

Related U.S. Patent Documents

Reissue of:
(64) Patent No.: 7,490,005
Issued: Feb. 10, 2009
Appl. No.: 11/115,843
PCT Filed: Apr. 26, 2005

U.S. Applications:
(63) Continuation of application No. 10/455,866, filed on Jun. 6, 2003, now Pat. No. 6,892,136, which is a continuation of application No. 09/682,200, filed on Aug. 3, 2001, now Pat. No. 6,604,047.

(51) Int. Cl.
*G01C 21/30* (2006.01)

(52) U.S. Cl. ..... 701/208; 701/200; 701/201; 701/207; 701/213; 701/214; 340/988; 342/357.31

(58) Field of Classification Search ..... 701/23, 701/35, 36, 200, 201, 207, 208, 213, 214; 340/988; 342/357.01, 357.08, 357.39
See application file for complete search history.

(56) References Cited

U.S. PATENT DOCUMENTS

| | | | |
|---|---|---|---|
| 3,980,041 | A | 9/1976 | Evans |
| 4,229,727 | A | 10/1980 | Gilhooley |
| 4,608,551 | A | 8/1986 | Takeo et al. |
| 4,731,613 | A | 3/1988 | Endo et al. |
| 4,882,689 | A | 11/1989 | Aoki |
| 4,964,052 | A | 10/1990 | Ohe |
| 5,087,919 | A | 2/1992 | Odagawa et al. |
| 5,146,219 | A | 9/1992 | Zechnall |
| 5,179,519 | A | 1/1993 | Adachi et al. |
| 5,202,829 | A | 4/1993 | Geier |
| 5,265,468 | A | 11/1993 | Holst et al. |
| 5,293,318 | A | 3/1994 | Fukushima |
| 5,311,173 | A | 5/1994 | Komura et al. |
| 5,367,306 | A | 11/1994 | Hollon et al. |
| 5,416,712 | A | 5/1995 | Geier et al. |
| 5,483,456 | A | 1/1996 | Kuwahara et al. |
| 5,485,161 | A | 1/1996 | Vaughn |

(Continued)

FOREIGN PATENT DOCUMENTS

EP 0522860 B1 6/1996

(Continued)

OTHER PUBLICATIONS

Court Papers from case No. 08CV-05061 .

(Continued)

*Primary Examiner* — Gertrude Arthur Jeanglaude
(74) *Attorney, Agent, or Firm* — Law Office of Scott C. Harris, Inc.

(57) ABSTRACT

A system for improving the operation of a GPS based navigator. Statistical and/or time of day information is used to select the best route between a current location and a desired location. The statistical information may take into account anomalies, and a user can select the amount of risk they which take. The system can be updated with more updated information. In addition, the selection of the desired location can be carried out by downloading information from a PDA.

20 Claims, 3 Drawing Sheets

U.S. PATENT DOCUMENTS

| | | | | |
|---|---|---|---|---|
| 5,485,381 | A | 1/1996 | Heintz et al. | |
| 5,523,765 | A | 6/1996 | Ichikawa | |
| 5,554,970 | A | 9/1996 | Mottahedeh | |
| 5,596,500 | A | 1/1997 | Sprague et al. | |
| 5,623,414 | A | 4/1997 | Misra | |
| 5,659,920 | A | 8/1997 | Haeri | |
| 5,752,219 | A | 5/1998 | Yoshihara et al. | |
| 5,774,828 | A * | 6/1998 | Brunts et al. | 701/210 |
| 5,790,974 | A * | 8/1998 | Tognazzini | 455/456.5 |
| 5,808,565 | A | 9/1998 | Matta et al. | |
| 5,862,511 | A | 1/1999 | Croyle et al. | |
| 5,890,092 | A | 3/1999 | Kato et al. | |
| 5,902,351 | A | 5/1999 | Streit et al. | |
| 5,909,440 | A * | 6/1999 | Ferguson et al. | 370/389 |
| 5,910,789 | A | 6/1999 | Vigen | |
| 5,938,719 | A | 8/1999 | Arakawa et al. | |
| 5,941,934 | A | 8/1999 | Sato | |
| 5,948,043 | A | 9/1999 | Mathis | |
| 5,952,941 | A | 9/1999 | Mardirossian | |
| 5,977,884 | A | 11/1999 | Ross | |
| 5,999,126 | A | 12/1999 | Ito | |
| 5,999,892 | A * | 12/1999 | Fan | 702/158 |
| 6,037,861 | A | 3/2000 | Ying | |
| 6,037,862 | A | 3/2000 | Ying | |
| 6,043,777 | A | 3/2000 | Bergman et al. | |
| 6,073,062 | A | 6/2000 | Hoshino et al. | |
| 6,144,338 | A | 11/2000 | Davies | |
| 6,175,806 | B1 | 1/2001 | Thuente | |
| 6,199,009 | B1 * | 3/2001 | Meis et al. | 701/202 |
| 6,208,934 | B1 * | 3/2001 | Bechtolsheim et al. | 701/209 |
| 6,246,948 | B1 | 6/2001 | Thakker | |
| 6,265,989 | B1 | 7/2001 | Taylor | |
| 6,282,464 | B1 * | 8/2001 | Obradovich | 701/1 |
| 6,310,544 | B1 | 10/2001 | Cohen | |
| 6,317,689 | B1 | 11/2001 | Lee | |
| 6,321,158 | B1 | 11/2001 | DeLorme et al. | |
| 6,326,613 | B1 | 12/2001 | Heslin et al. | |
| 6,334,090 | B1 | 12/2001 | Fujii | |
| 6,336,072 | B1 * | 1/2002 | Takayama et al. | 701/200 |
| 6,366,242 | B1 | 4/2002 | Boyd et al. | |
| 6,366,856 | B1 | 4/2002 | Johnson | |
| 6,381,540 | B1 | 4/2002 | Beason et al. | |
| 6,429,808 | B1 | 8/2002 | King et al. | |
| 6,430,505 | B1 | 8/2002 | Green | |
| 6,462,675 | B1 | 10/2002 | Humphrey et al. | |
| 6,466,846 | B2 | 10/2002 | Maynard | |
| 6,496,709 | B2 | 12/2002 | Murray | |
| 6,515,596 | B2 | 2/2003 | Awada | |
| 6,526,336 | B2 | 2/2003 | Treyz et al. | |
| 6,529,827 | B1 | 3/2003 | Beason et al. | |
| 6,556,905 | B1 | 4/2003 | Mittelsteadt et al. | |
| 6,604,047 | B1 * | 8/2003 | Harris | 701/213 |
| 6,633,811 | B1 | 10/2003 | Aumayer | |

FOREIGN PATENT DOCUMENTS

| | | | |
|---|---|---|---|
| GB | 2355877 | A | 5/2001 |
| JP | 07280931 | A | 10/1995 |
| JP | 08068642 | A | 3/1996 |
| JP | 08304091 | A | 11/1996 |
| WO | 0198794 | A2 | 12/2001 |

OTHER PUBLICATIONS

1999 Acura TL, 1999 Acura TL Navigation System, Honda Motor Company, Ltd., Aug. 4, 1998.
1999 Acura TL Navigation System Manual, Honda Motor Company, Ltd., Acura TL Navigation System (1998).
2000 I30/Q45 Infiniti, 2000 I30/Q45 Infiniti Navigation System, Nissan Motor Co. Ltd., 2000.
2000 I30/Q45 Infiniti User Manual, Nissan Motor Co. Ltd., 2000 I30/Q45 Infiniti Navigation System User Manual (2000).
Apollo 360, Apollo 360 GPS Receiver, II Morrow, Inc., 1994.
Apollo 360 User's Guide, II Morrow, Inc., Apollo 360 GPS Receiver User's Guide (1994-1997).
Apollo 600 Series, Apollo 600 Series, II Morrow, Inc., 1988-1991.
Apollo 600 Operating Handbook, II Morrow, Inc., Apollo 618 With Airspace Alert Pilot's Operating Handbook (1991).
Apollo 800, Apollo 800 Flybuddy, II Morrow, Inc., 1990.
Apollo 800 Operating Manual, II Morrow, Inc., Apollo 800 Flybuddy Pilot's Operating Manual (1990-1991).
Apollo 900, Apollo 900 Handheld GPS Receiver, II Morrow, Inc., 1993.
Apollo 900 User's Guide, II Morrow, Inc., Handheld GPS Receiver User's Guide 560-0101-04 (1993-1994).
Apollo NMC, Apollo Navigation Management Computer, II Morrow, Inc. / UPS Aviation Technologies, Inc., 1999.
Apollo NMC Operating Manual, II Morrow, Inc. / UPS Aviation Technologies, Inc., Apollo NMC Navigation Management Computer Operating Manual (1999).
Apollo Precedus, Apollo Precedus, II Morrow, Inc., 1997.
Apollo Precedus User's Guide, II Morrow, Inc., Apollo Precedus User's Guide (1997).
Datus PNA, Datus PNA, Datus, Inc., 1999.
Datus PNA Owner's Manual, Datus, Inc., Datus PNA Owner's Manual (2000).
Mehaffey, Joe and Jack Yeazel, The ETAK SkyMap GPS/Moving Map Display System, ETAK SkyMap Review (1998) (reviewing ETAK SkyMap GPS/Moving Map Display System).
Garmin eMap eMap, Garmin Corporation, 1999.
Garmin eMap Owner's Manual, Garmin Corporation, Gamin eMap Electronic Map Owner's Manual and Reference Guide (1999-2001).
Garmin GNC 250, GNC 250, Garmin Corporation, 1995.
Garmin GNC 250 Pilot's Guide, Garmin Corporation, GNC 250 Pilot's Guide (1995).
Garmin GNC 250 XL, GNC 250 XL, Garmin Corporation, 1997.
Garmin GNC 250 XL Pilot's Guide, Garmin Corporation, GNC 250 XL Pilot's Guide and Reference (1997).
Garmin GNC 300, GNC 300, Garmin Corporation, 1996.
Garmin GNC 300 Pilot's Guide, Garmin Corporation, GNC 300 Pilot's Guide and Reference Manual (1996).
Garmin GNC 300 XL, GNC 300 XL, Garmin Corporation, 1999.
Garmin GNC 300 XL Pilot's Guide, Garmin Corporation, GNC 300 XL Pilot's Guide and Reference (1999).
Garmin GPS 12 Map, GPS 12 Map, Garmin Corporation, 1999.
Garmin GPS 12 Map Owner's Manual, Garmin Corporation, GPS 12 Map Owner's Manual and Reference Guide (1999-2000).
Garmin GPS 55AVD, GPS 55AVD, Garmin International, Inc., 1992.
Garmin GPS 55AVD Owner's Manual, Garmin International, Inc., GPS 55AVD Personal Navigator Owner's Manual (1992).
Garmin GPS 89, GPS 89, Gamin International, Inc., 1996.
Garmin GPS 89 Owner's Manual, Garmin International, Inc., GPS 89 Personal Navigator Owner's Manual and Reference (1996).
Garmin GPS 90, GPS 90, Garmin International, Inc., 1995.
Garmin GPS 90 Owner's Manual, Garmin International, Inc., GPS 90 Personal Navigator Owner's Manual and Reference (1995).
Garmin GPS 92, GPS 92, Garmin Corporation, 1998.
Garmin GPS 92 Owner's Manual, Garmin Corporation, GPS 92 Owner's Manual and Reference (1998).
Garmin GPS 95AVD, GPS 95AVD, Garmin International, Inc., 1993.
Garmin GPS 95AVD Owner's Manual, Garmin International, Inc., GPS 95AVD Personal Navigator Owner's Manual (1993).
Garmin GPS 95 STD, GPS 95 STD, Garmin International, Inc., 1993.
Garmin GPS 95 STD Owner's Manual, Garmin International, Inc., GPS 95 STD Personal Navigator Owner's Manual (1993).
Garmin GPS 95 XL, GPS 95 XL, Garmin International, Inc., 1994.
Magellan Map 410 User Manual, Magellan Corporation, Magellan Map 410 User Manual (1999).
Magellan Meridian XL, Meridian XL, Magellan Navigation, Inc., 1996.
Magellan Meridian XL User Manual, Magellan Navigation, Inc., Meridian XL User Manual (1996).
Magellan NAV 5000DLX User Guide, Magellan Navigation, Inc., NAV 5000DLX User Guide (1994).
Magellan NAV DLX-10, NAV DLX10, Magellan Navigation, Inc., 1995.
Magellan NAV DLX-10 User Manual, Magellan Navigation, Inc., NAV DLX10 User Manual (1995).
Magellan TrailBlazer XL, TrailBlazer XL , Magellan Navigation, Inc., 1995.

Magellan TrailBlazer XL Reference Guide, Magellan Navigation, Inc., TrailBlazer XL Reference Guide (1995).
Magnavox MX100, MX100 GPS Navigator, Magnavox Government and Industrial Electronics Company, 1991.
Magnavox MX100 Operating Instructions, Magnavox Government and Industrial Electronics Company, MX100 GPS Navigator Operating Instructions (1991). (See NAVICO002320-NAVICO002363).
Garmin GPS 95 XL Owner's Manual, Garmin International, Inc., GPS 95 XL Personal Navigator Owner's Manual (1994).
Garmin GPS 100, GPS 100 Personal Navigator, Garmin International, Inc., 1992.
Garmin GPS 100AVD Owner's Manual, Garmin International, Inc., GPS 100AVD Personal Navigator Owner's Manual (1992).
Garmin GPS 150, GPS 150, Garmin Corporation, 1997.
Garmin GPS 150 Pilot's Guide, Garmin Corporation, GPS 150 Pilot's Guide Owner's Manual and Reference (1997).
Garmin GPS 150 XL, GPS 150 XL, Garmin Corporation, 1997.
Solus Pro/Topo USA, Solus Pro/Topo USA, DeLorme Publishing Company (1998).
Apollo 360 GPS Receiver Quick Reference Guide, Part No. 561-0161-00 Rev. A, © 1996.
Apollo 360 GPS STC SA00146SE, Part No. 560-0916-00 Rev. a, Jun. 15, 1995.
Apollo 360 Map Display User's Guide, Part No. 561-1119-00, © 1996.
Apollo 360 Map Display Quick Reference Guide, Part No. 561-0163-00, © 1996.
Apollo 604 Quick Reference Guide Version 2.0, Part No. 561-0061B Rev. 4, © 1989.
Apollo 800 Flybuddy Quick Reference Guide, Part No. 561-0060A.
Apollo 820 Flybuddy GPS Pilot's Operating Manual, Part No. 560-0067 Rev. 0, © 1991.
Apollo 820 Flybuddy GPS Quick Reference Guide, Part No. 561-0070.
Apollo 920 GPS Quick Start Guide, © 1994.
Apollo GX User's Guide Models 50, 55, 60, 65, Part No. 560-0961-03b, © 2003.
Apollo GX50 Dealer/Customer Training Package, © 1998.
Apollo GX50 Quick Reference Guide, Part No. 561-0238-02, © 2001.
Apollo I Loran C Navigation Receiver Model 602, Part No. 561-0012.
Apollo II Model 612B Pilot's Operating Handbook, Part No. 560-0061D Rev. 4, 1987.
Apollo II Models 612, 614P, 614R Quick Reference Guide, Part No. 561-0017B, 1986.
Apollo Loran C Receiver Operation Manual, Part No. 560-0010, © 1983.
Apollo Loran C Receiver Model 604 Pilot's Operating Handbook, Part No. 560-0038D Rev. 4, 1989.
Apollo NMC 2001/2101 Approach Checklist, Part No. 561-1039-00, Apr. 1996.
Apollo NMS 2001/2101 Quick Reference Guide, Part No. 561-0228-00, © 1996.
Apollo Precedus Quick Reference Guide, Part No. 560-0115-01, © 1995.
Apollo SL10 Audio Selector Panel User's Guide UPS Aviation Technologies, Part No. 560-0973-00a, © 2001.
Apollo SL15 Series Audio Selector Panel Operation Manual UPS Aviation Technologies, Part No. 560-0975-03 © 2001.
Apollo AL50 GPS Receiver and SL60 GPS Receiver/VHF Comm User's Guide, Part No. 560-0955-01 Rev. C © 2003.
Clarke, John "A Speed Alarm for Cars", http://www.siliconchip.com.au/cms/A_103208/article.html, Nov. 10, 1999.
Garmin AT, Inc. 14 CFR Part 26 FCAS List, Document No. PD1669 Rev. 1, Nov. 3, 2008.
Garmin Declaration of Conformity for Electro Magnetic Conformity, Nov. 10, 2003.
Garmin DGPS 53 Integrated GPS/DGPS Receiver Owner's Manual and Reference Guide, Part No. 190-00194-00 Rev. A, © 2000.
Garmin Edge 605/705 GPS-Enabled Bike Computer Owner's Manual, Part No. 190-00813-00 Rev. D, © 2009.
Garmin Edge 605/705 GPS-Enabled Bike Computer Quick Reference Guide, Part No. 190-00813-01 Rev. D © 2009.
Garmin Edge 605/705 GPS-Enabled Bike Computer Owner's Manual, Part No. 190-00813-00 Rev. C © 2008.
Garmin eTrex Summit Personal Navigator Owner's Manual and Reference Guide, Part No. 190-00193-00 Rev. D © 2001.
Garmin eTrex Venture Personal Navigator Owner's Manual and Reference Guide, Part No. 190-00203-00 Rev. D © 2002.
Garmin Fishfinder 100 Owner's Manual, Part No. 190-00173-00 Rev. A, © 1999.
Garmin Fishfinder 100 Blue Owner's Manual, Part No. 190-00198-00 Rev. A, © 2001.
Garmin Fishfinder 160 Owner's Manual, Part No. 190-00154-10 Rev. A, © 1999.
Garmin Fishfinder 160 Blue Owner's Manual, Part No. 190-00199-00 Rev. B, 0 2001.
Garmin Fishfinder 240 Owner's Manual, Part No. 190-00155-10 Rev. A, © 2000.
Garmin Flush Mount Template, Part No. 190-00183-01 Rev. A.
Garmin GPS 150 XL Pilot's Guide, Garmin Corporation, GPS 150 XL Pilot's Guide Owner's Manual and Reference (1997).
Garmin GPS 155TSO, GPS 155TSO, Garmin Corporation, 1995.
Garmin GPS 155TSO Pilot's Guide, Garmin Corporation, GPS 155TSO Pilot's Guide Owner's Manual and Reference (1995).
Garmin GPS 155XL, GPS 155XL, Garmin Corporation, 1999.
Garmin GPS 155XL Pilot's Guide, Garmin Corporation, GPS 155XL Pilot's Guide and Reference (1999).
Garmin GPS 165TSO, GPS 165TSO, Garmin Corporation, 1995.
Garmin GPS 165TSO Pilot's Guide, Garmin Corporation, GPS 165TSO Pilot's Guide and Reference (1995).
Garmin GPSCOM 190, GSPCOM 190, Garmin Corporation, 1996.
Garmin GPSCOM 190 Owner's Manual, Garmin Corporation, GPSCOM 190 Owner's Manual and Reference (1996).
Garmin GPS III, GPS III Garmin Corporation, 1997.
Garmin GPS III Pilot, GPS III Pilot, Garmin Corporation, 1997.
Garmin GPS III Owner's Manual, Garmin Corporation, GPS III Pilot Owner's Manual and Reference (1999).
Garmin GPS III Plus, GPS III Plus, Garmin Corporation, 1997.
Garmin GPS III Plus Owner's Manual, Garmin Corporation, GPS III Plus Owner's Manual and Reference (1997).
Garmin GPSMAP 195, GPSMAP 195, Garmin Corporation, 1996.
Garmin GPSMAP 195 Pilot's Guide, Garmin Corporation, GPSMAP 195 Pilot's Guide and Reference (1996-1999).
Garmin NavTalk, NavTalk, Garmin Corporation, 1999.
Garmin NavTalk Owner's Manual, Garmin Corporation, Garmin NavTalk Cellular Phone / GPS Receiver Owner's Manual and Reference Guide (1999).
Garmin NavTalk Pilot, NavTalk Pilot, Garmin Corporation, 2000.
Garmin NavTalk Pilot Pilot's Guide, Garmin Corporation, NavTalk Pilot Pilot's Guide and Reference (2000).
Garmin StreetPilot GPS ColorMap, StreetPilot GPS ColorMap, Garmin Corporation, 1999.
Garmin StreetPilot GPS ColorMap Owner's Manual, Garmin Corporation, StreetPilot GPS ColorMap Owner's Manual and Reference Guide (1999-2000).
Garmin StreetPilot Atlantic ColorMap, StreetPilot Atlantic ColorMap, Garmin Corporation, 1999.
Garmin StreetPilot Atlantic ColorMap Owner's Manual, Garmin Corporation, StreetPilot Atlantic ColorMap Owner's Manual and Reference Guide (1999).
Magellan GPS 300, Magellan GPS 300, Magellan Corporation, 1999.
Magellan GPS 300 User Manual, Magellan Corporation, Magellan GPS 300 User Manual (1999).
Magellan GPS 315, Magellan GPS 315, Magellan Corporation, 2000.
Magellan GPS 320, Magellan GPS 320, Magellan Corporation, 2000.
Magellan GPS 315/320 User Manual, Magellan Corporation, Magellan GPS 315/320 User Manual (2000).
Magellan GPS 2000; Magellan GPS 2000, Magellan Navigation, Inc., 1995.

Magellan GPS 2000 User Guide, Magellan Navigation, Inc., Magellan GPS 2000 User Guide (1995).
Magellan GPS 2000 XL, Magellan GPS 2000 XL, Magellan Navigation, Inc., 1996.
Magellan GPS 2000 XL User Manual, Magellan Navigation, Inc., Magellan GPS 2000 XL User Manual (1996).
Magellan GPS 3000, Magellan GPS 3000, Magellan Navigation, Inc., 1995.
Magellan GPS 3000 User Guide, Magellan Navigation, Inc., Magellan GPS 3000 Satellite Navigator User Manual (1995).
Magellan GPS 3000 XL, Magellan GPS 3000 XL, Magellan Navigation, Inc., 1996.
Magellan GPS 3000 XL User Guide, Magellan Navigation, Inc., Magellan GPS 3000 XL Satellite Navigator User Manual (1996).
Magellan GPS 4000, Magellan GPS 4000, Magellan Navigation, Inc., 1996.
Magellan GPS 4000 User Guide, Magellan Navigation, Inc., Magellan GPS 4000 Satellite Navigator User Manual (1996).
Magellan GPS 4000 XL, Magellan GPS 4000 XL, Magellan Navigation, Inc., 1996.
Magellan GPS 4000 XL User Guide, Magellan Navigation, Inc., Magellan GPS 4000 XL Satellite Navigator User Manual (1996).
Magellan GPS Blazer12, Magellan GPS Blazer12, Magellan Systems Corporation, 1999.
Magellan GPS Blazer12 User Manual; Magellan Systems Corporation, Magellan GPS Blazer12 User Manual (1999).
Magellan GPS ColorTRAK, Magellan GPS ColorTRAK, Magellan Systems Corporation, 1998.
Magellan GPS CoIorTRAK User Manual, Magellan Systems Corporation, Magellan GPS CoIorTRAK Satellite Navigator User Manual (1998).
Magellan GPS Companion, Magellan GPS Companion / Map Companion CD, Magellan Corporation, 2000.
Magellan GPS Companion Guide, Magellan Corporation, GPS Companion (2000).
Magellan Map 330 Series, Magellan Map 330 Series, Magellan Corporation, 2000.
Magellan Map 330 Series User Manual, Magellan Corporation, Magellan Map 330 Series User Manual (2000).
Magellan Map 410, Magellan Map 410, Magellan Corporation, 1999.
Garmin GPSMap 295 Pilot's Guide and Reference, Part No. 190-00174-00 Rev. C, © 2002.
Garmin GPSMap 295 Quick Start Guide, Part No. 190-00174-01 Rev. B, © 2000.
Garmin GTX 320 Transponder Pilot's Guide, Part No. 190-00133-00 Rev. A, © 1997.
Garmin GTX 320A Mode A/C Transponder Pilot's Guide, Part No. 190-00133-09 Rev. A, © 2000.
Garmin Introduction to Geocaching, Part No. 190-00252-00 Rev. A, © 2001.
Garmin Loran TD Position Format Handbook, Part No. 190-00190-00 Rev. A, © 1999.
Garmin Nuvi 800 Series Personal Travel Assistant Quick Start Manual, Part No. 190-00847-01 Rev. C, © 2008.
Garmin Nuvi 800 Series Personal Travel Assistant Owner's Manual, Part No. 190-00847-00 Rev. B, © 2008.
Garmin Nuvi 805 Series Owner's Manual, Part No. 190-01047-00 Rev. A, © 2008.
Garmin Nuvi 805 Series Quick Start Manual, Part No. 190-01047-01 Rev. A, © 2008.
Garmin Nuvi 880 Personal Travel Assistant with MSN Direct Quick Start Manual, Part No. 190-00847-02 Rev. C © 2008.
Gamin Nuvi 885 with MSN Direct Quick Start Manual, Part No. 190-01047-02 Rev. A, © 2008.
Garmin PCX5/PCX5AVD/PC150 PC Software Kit Owner's Manual, Part No. 190-00045-00 Rev. D, © 1999.
Garmin VHF 720 Marine Radio Owner's Manual and Reference Guide, Part No. 190-00150-00 Rev. B. © 1999.
Garmin VHF 725 Submersible Marine Radio Owner's Manual and Reference Guide, Part No. 190-00179-00 Rev. A. © 1999.
Garmin VHF 725e Submersible Marine Radio Owner's Manual and Reference Guide, Part No. 190-00163-00 Rev. A, © 1999.
Hogan, Thom "Hertz Neverlost Navigation System", http://www.bythom.com/neverlost.htm, 2001.
II Morrow Model 618, 618C, 618R Quick Reference Guide, Part No. 561-0086A Rev. 1, © 1989.
II Morrow Waypoint Manager for Windows Version 4 User's Guide, Part No. 560-0138-02 Rev. 2, © 1998.
Jensen, C.S. et al. "The INFATI Data" A TimeCenter Technical Report TR-79, Jul. 28, 2004.
Magellan DataSend User's Guide for use with the GPS 315/320, Part No. 630333 Rev. A, © 1999.
Magellan GPS 315/320 Questions and Solutions.
Magellan GPS Satellite Navigator Meridian XL and NAV 1200XL Reference Guide, Part No. 22-10211-000 © 1995.
Magellan GPS SkyNav 5000 User Guide, Part No. 22-40002-030, © 1994.
Magellan NAV 6500/NAV 6510 User Manual, Part No. 630323, © 1998.
Mehaffey, Joe and Jack Yeazel "Magellan Model 315 GPS Receiver", http://gpsinformation.net/main/mag-315.htm Aug. 31, 1999.
Mehaffey, Joe and Jack Yeazel "The Magellan Map 330(X) Mapping GPS Receiver", http://gpsinformation.net/main/mag-330.htm, Dec. 4, 2002.
Paine, Michael "Speed Control Devices for Cars" Roads and Traffic Authority Road Safety and Traffic Management Research Report RR 5/96, ISBN 0 7310 5304 4, Jul. 1996.
"Speed alarm" Car TalkTalk Discussion Thread, http://action.publicbroadcasting.net/cartalk/posts/list/951412.page Ending Apr. 9, 2008.
Tomtom Mobile User Guide Manual and Tutorials, © 2004.
Tomtom Navigator HP Edition Manual, © 2004.
Tomtom Navigator Quick Start Guide User Guide Installation Poster Manual and Tutorials, v4.10 © 2004.
Tomtom Navigator Quick Start Guide User Guide Installation Poster Manual and Tutorials, © 2004.
Tomtom Navigator Traffic Plug-In Introduction, © 2004.
Zhao, Yilin "Mobile Phone Location Determination and Its Impact on Intelligent Transportation Systems", IEEE Transactions on Intelligent Transportation Systems, vol. 1, No. 1, Mar. 2000.
Garmin GA 26C Remote GPS Antenna Installation Instructions, Part No. 190-00082-00 Rev. C, © 2000.
Garmin GBR 23 Beacon Receiver Owner's Manual and Reference Guide, Part No. 190-00195-00 Rev. A © 2000.
Garmin GMA 340 Audio Panel Pilot's Guide, Part No. 190-00149-10 Rev. C, © 2001.
Garmin GNC 250 Pilot's Quick Reference Guide, Part No. 190-00067-51 Rev. A, © 1995.
Garmin GNC 300 Installation Manual, Part No. 190-00067-02 Rev. J, © 1998.
Garmin GPS 12 Personal Navigator Owner's Manual and Reference, Part No. 190-00143-10 Rev. B, © 1999.
Garmin GPS 12, 12XL, 48, 80 Addendum, Part No. 190-00239-00 Rev. A, © 2001.
Garmin GPS 12CX Personal Navigator Owner's Manual and Reference, Part No. 190-00160-00 Rev. B, © 1999.
Garmin GPS 12XL Personal Navigator Owner's Manual and Reference, Part No. 190-00134-00 Rev. C, © 1997.
Garmin GPS 12XL Personal Navigator Owner's Manual and Reference, Part No. 190-00134-10 Rev. A, © 1998.
Garmin GPS 16 GPS Receiver/Antenna Quick Start Guide, Part No. 190-00228-11 Rev. B, © 2001.
Garmin GPS 25 LP Series GPS Sensor Boards GPS25-LVC, GPS25-LVS, GPS25-HVS Technical Specification Part No. 190-00125-00 Rev. G, © 2000.
Garmin GPS 31/31 SL TracPak Technical Information, Part No. 190-00103-00 Rev. C, © 1996.
Garmin GPS 35 LP TracPak GPS Smart Antenna Technical Specification Models: GPS35-LVC, GPS35-LVS, GPS35-HVS, Part No. 190-00148-00 Rev. E, © 2000.
Garmin GPS 35 PC Quick Start Guide, Part No. 190-00115-00 Rev. B, © 1999.
Garmin GPS 35 USB Installation and Quick Start Guide, Part No. 190-00245-00 Rev. A, © 2001.

Garmin GPS 35/36 TracPak GPS Smart Antenna Technical Specification, Part No. 190-00104-00 Rev. D © 1999.
Garmin GPS 38 Personal Navigator Owner's Manual and Reference, Part No. 190-00112-00 Rev. B © 1997.
Garmin GPS 40 Personal Navigator Owner's Manual and Reference, Part No. 190-00063-00 Rev. B © 1994.
Garmin GPS 45 Personal Navigator Owner's Manual and Reference, Part No. 190-00070-00 Rev. B © 1994.
Garmin GPS 45XL Personal Navigator Owner's Manual and Reference, Part No. 190-00123-00 Rev. C © 1996.
Garmin GPS 48 Personal Navigator Owner's Manual and Reference, Part No. 190-00141-00 Rev. B © 1999.
Garmin GPS 50 Personal Navigator Owner's Manual, Part No. 190-00015-01 Rev. B, © 1992.
Garmin GPS 65 Personal Navigator Owner's Manual, Part No. 190-00038-00 Rev. G, © 1993.
Garmin GPS 75 Personal Navigator Owner's Manual, Part No. 190-00046-00 Rev. D, © 1993.
Garmin GPS 76 Owner's Manual and Reference Guide, Part No. 190-00229-00 Rev. B, © 2001.
Garmin GPS 100 Personal Navigator Owner's Manual, Part No. 190-00001-00 Rev. A, © 1992.
Garmin GPS 100 Aviation Kit Installation Manual, Part No. 190-00004-00 Rev. G, © 1992.
Garmin GPS 120 User's Guide Owner's Manual and Reference, Part No. 190-00100-00 Rev. A, © 1995.
Garmin GPS 120XL Marine Navigator Owner's Manual and Reference, Part No. 190-00136-00 Rev. B, © 1997.
Garmin GPS 125 Sounder Marine Navigator Owner's Manual and Reference, Part No. 190-00111-00 Rev. B © 1997.
Garmin GPS 126/126 Marine Navigator Owner's Manual and Reference, Part No. 190-00151-00 Rev. A © 1997.
Garmin GPS 150 Installation Manual, Part No. 190-00026-00 Rev. Q, © 1998.
Garmin GPS 155/165 Pilot's Guide Addendum, Part No. 190-00065-10 Rev. B, © 1998.
Garmin GPS II Owner's Manual and Reference, Part No. 190-00118-00 Rev. A, © 1996.
Garmin GPS II Plus Owner's Manual and Reference, Part No. 190-00130-00 Rev. A,© 1997.
Garmin GPS II Plus Owner's Manual and Reference, Part No. 190-00130-10 Rev. A,© 1998.
Garmin GPS II Plus Quick Reference Guide, Part No. 190-00130-01 Rev. A, © 1998.
Garmin GPS III Plus Features Addendum, Part No. 190-00162-02 Rev. A, © 1999.
Garmin GPS V Personal Navigator Owner's Manual and Reference Guide, Part No. 190-00204-10 Rev. C © 2003.
Garmin GPSCOM 170 Owner's Manual and Reference, Part No. 190-00093-00 Rev. D, © 1997.
Garmin GPSMap 130 Owners Manual and Reference, Part No. 190-00106-00 Rev. B, © 1996.
Garmin GPSMap 135 Sounder Owner's Manual and Reference, Part No. 190-00107-00 Rev. C, © 1997.
Garmin GPSMap 162 Chartplotting Receiver Owner's Manual and Reference Guide, Part No. 190-00169-00 Rev. C, © 2001.
Garmin GPSMap 175 Owner's Manual and Reference, Part No. 190-00096-00 Rev. A, © 1996.
Garmin GPSMap 185 Sounder Owner's Manual and Reference, Part No. 190-00158-10 Rev. A, © 1999.
Garmin GPSMap 200 Integrated GPS Navigator Users Manual, Part No. 190-00052-00 Rev. D, © 1993.
Garmin GPSMap 205/210/220 Owners Manual and Reference, Part No. 190-00061-00 Rev. B, © 1994.
Garmin GPSMap 215/225 Owner's Manual and Reference, Part No. 190-00061-20 Rev. B, © 2000.
Garmin GPSMap 235 Sounder Owner's Manual and Reference, Part No. 190-00138-10 Rev. B, © 1999.

* cited by examiner

NON REAL TIME TRAFFIC SYSTEM FOR A NAVIGATOR

Matter enclosed in heavy brackets [ ] appears in the original patent but forms no part of this reissue specification; matter printed in italics indicates the additions made by reissue.

CROSS RELATED APPLICATIONS

This application is a continuation of *U.S. application Ser. No. 10/455,866, filed Jun. 6, 2003, now U.S. Pat. No. 6,892, 136 issued May 10, 2005, which is a continuation of* U.S. application Ser. No. 09/682,200 filed Aug. 3, 2001 now U.S. Pat. No. 6,604,047 *issued Aug. 5, 2003*.

BACKGROUND

Various systems, including but not limited to the Magellan 750 ("NeverLost(™)") device automatically track the user's whereabouts and instructs the user on the best way to get from point A to point B. For example, systems such as this may find the user's current position using satellite positioning systems such as the GPS constellation array. The user may enter a desired location. The program includes map data which includes a time that it will take, on average, to traverse a given stretch of roadway. This data may be acquired by simply dividing the speed limit by the length of the roadway. The system carries out a program to determine a most efficient way for the user to get to his desired location.

This system may operate admirably, and almost always results in the user getting to their desired location. However, the selection of routes does not take into account the real situation. For example, the user who knows an area will often select a better route than the computer will select.

SUMMARY

The present application teaches an improvement to existing navigator systems which enables improvements and new techniques in selection of routes.

In one aspect, the present application teaches use of statistical data in selecting the proper route.

In another aspect, the system may use real-time information.

An interface with the information stored in a PDA is disclosed.

Another aspect teaches a way in which the route may be calculated to allow the user to start in the proper direction.

Yet another aspect teaches a way of using the system to determine a location in for the user to obtain some desired product or service.

BRIEF DESCRIPTION OF THE DRAWINGS

These and other aspects will now be described in detail with reference to the accompanying drawings, wherein:

FIG. 3 shows a flowchart of route finding operations; and.

DETAILED DESCRIPTION

Figure 1:
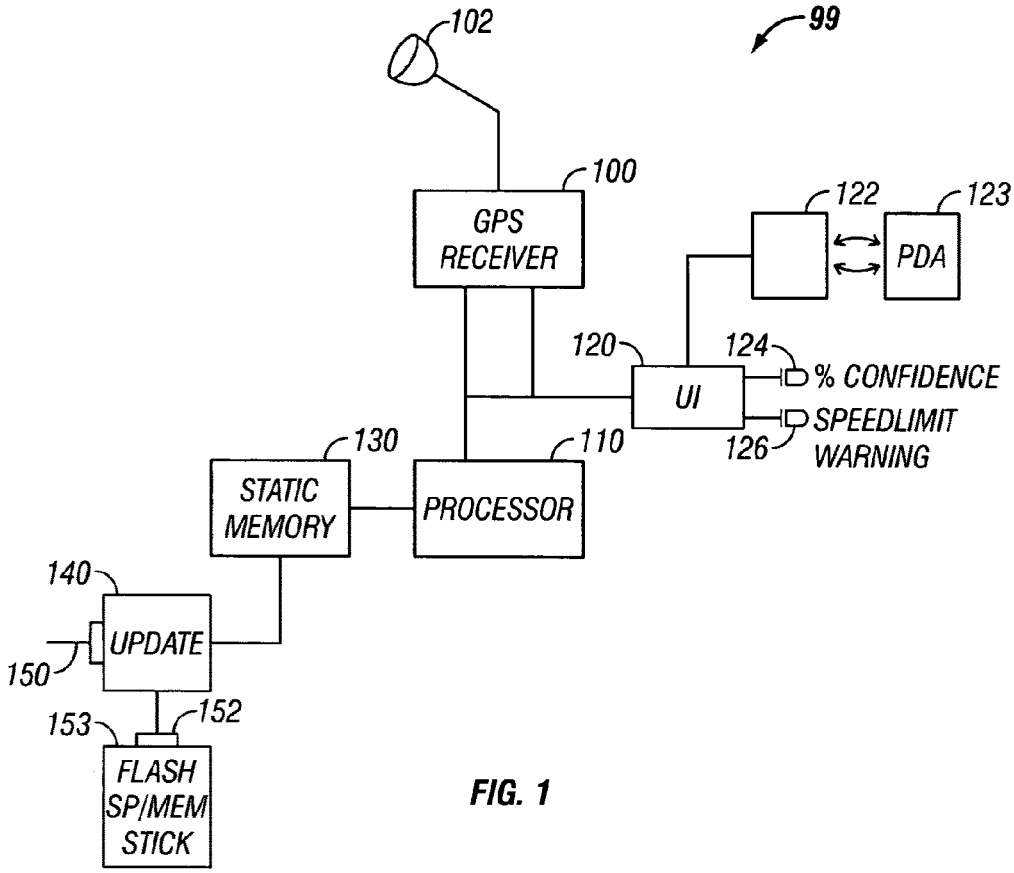
FIG. 1 shows a block diagram of the system.

A block diagram of the system is shown in FIG. 1. A GPS receiver 100 is shown connected to an appropriate GPS antenna 102 to track the location of the installed device 99. This location may be in a vehicle, for example. A processor 110 is connected to the GPS receiver and may control the operation of the GPS receiver and also receive incoming information therefrom. The processor is connected to a memory 130 which is shown herein as a static memory. In current technology, this may be a hard drive, but could alternatively be flash memory or another kind of read/write memory. The memory is connected to an update module 140. As shown, the update module may have a connection to a network line 150 which may be a telephone, an thernet connection, or any other kind of connection to any source of information. The update module may also include a connector 152 allowing connection of a portable memory shown as 153. The portable memory, for example, may be camera type memory, such as flash memory, S.D. memory, or a memory stick. The memory is used for updating information, as described herein.

A user interface 120 is connected to the processor, and provides information to a user, as well as accepting input from a user. The input may be provided from the user in a conventional way, such as on a miniaturized keyboard or trackwheel. An alternative data information is via a PDA interface assembly shown as 122. This may enable a user to enter information about their desired route or destination into PDA 123. Downloading of such desired routes are already available on certain Web sites such as HTTP:\\www.MapQuest.com.

Alternatively, the PDA often stores addresses indicating the addresses of the user's contacts. The address from the PDA may be also transferred to the PDA interface device 122. The PDA interface device may be for example an infrared port, for those PDAs which have infrared capability. For example, on Palm operating system devices, the user of the PDA can select the option to "beam address". The Palm unit will then beam the address to the interface device 122 which receives and decode to the beamed address, and uses that as the desired location. Alternatively, the interface device may be a connection to the serial, parallel or USB port on the PDA.

The user interface also includes a keyboard as described above and a display. Additional functions may be provided. One such function is the indicator 124, which may indicate, for example, the likelihood that the device is actually tracking the proper location of the installed device 99. Many times, the GPS receiver has not adequately acquired sufficient data to be sure that it knows its proper location. When that happens, the GPS receiver may return its best guess information, but might not be very sure or of that information. Accordingly, the indicator 124 may be a bicolor LED which may be green to indicate that the GPS receiver is highly confident in its current location. It may be red to indicate that the confidence level in the current location is low. Another indicator at 126 is a speed limit warning. The map data stored in the static memory 130 often includes the road's speed limits. As part of the synchronization via the GPS receiver, the system automatically acquires the speed of the vehicle. The indicator 126 may be a settable indicator that indicates when the user, for example, is going 10 mph above the speed limit.

The static memory 130 stores information about maps and routes within those maps. In order to make a decision about the best route to take, the static memory often needs information about how long it will take to get from one point in the map to another. The routines of FIG. 2 may be used according to this embodiment to get this information. Certain existing satellite systems, such as the etak system, provide traffic reports that indicate to user the current status of current traffic. The main problem with this system, however, is that the traffic report is current as of the time it is given, not when the user actually arrives there. Many users lose confidence in such traffic reports because by the time they arrive at the scene, the traffic may be changed. In addition, the infrastructure necessary to provide such real-time information may be extremely costly.

The present application teaches a system which may improve the ability to find the best route, but does so using a statistical technique. According to the present system, information about real progress through certain roots is accumulated. This data is accumulated as a function of time of day. The information is used to form statistical data. The statistical data may include, for example, the percent of anomalies. One example is anomalies caused by special events. Roadways which pass close to situses of events may often have high traffic at the time of the event. By noting the number of times that anomalies occur, the "expected value" of the time of a trip may be lowered.

A route may be selected based on different parameters. For example, the route may be selected for the one which is most consistently clear. Anomalies may be taken into account when calculating the route, but the user may choose to take a chance that any route will still be the best. All of this is at the user's discretion, but allows the system to have more accurate data based on statistical analysis.

Figure 2:
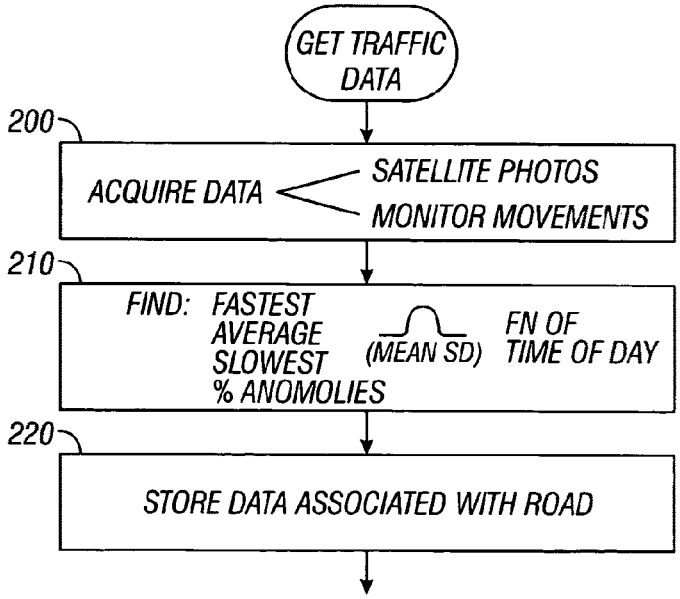
FIG. 2 shows a flowchart of finding traffic information.

The date acquisition routine is shown in FIG. 2. The heart of the data acquisition routine is 200 which acquires real data from real movements. This may be carried out via monitoring satellite photos, for example, to find different movements of different vehicles. Since satellite photos are often taken at separated times, these movements may be used to find the average time to traverse a given stretch of roadway. Another technique, which is disclosed herein, is made possible by the fact that the unit 110 actually tracks users movements. Accordingly, the second alternative is to monitor movements within the installed vehicle 99, and later obtain information from many different users as part of the update routine.

In this contemplated that certain users will not want their movements to be monitored, for example based on privacy concerns. This system will therefore provide the user with the capability of making their movements private. However, a certain advantage may be offered to those users who allow data about to their movements to be uploaded as part of the update routine. Note that the data can be anonymous data, i.e. it can be uploaded without any indication of its origin. As an example of the advantage provided to those users who allow the data to be uploaded,a user may receive a discount on updates if they allow their data to be uploaded as part of the process.

At 210, the real-time data is used to find the various information about the different roadways. As a function of time of day, this system may find the fastest time, slowest time, average time, as well as higher order statistics about these times. These higher order statistics may include mean and standard deviation. Another parameter which may be used includes likelihood of anomalies: indicating a percentage of the time that the actual time to traverse is significantly different then the average time to traverse. All of this information is accumulated into a form associated with the stretch of roadway and will be stored in the static memory 130. The storage of the data is shown occurring at 220.

Figure 3:
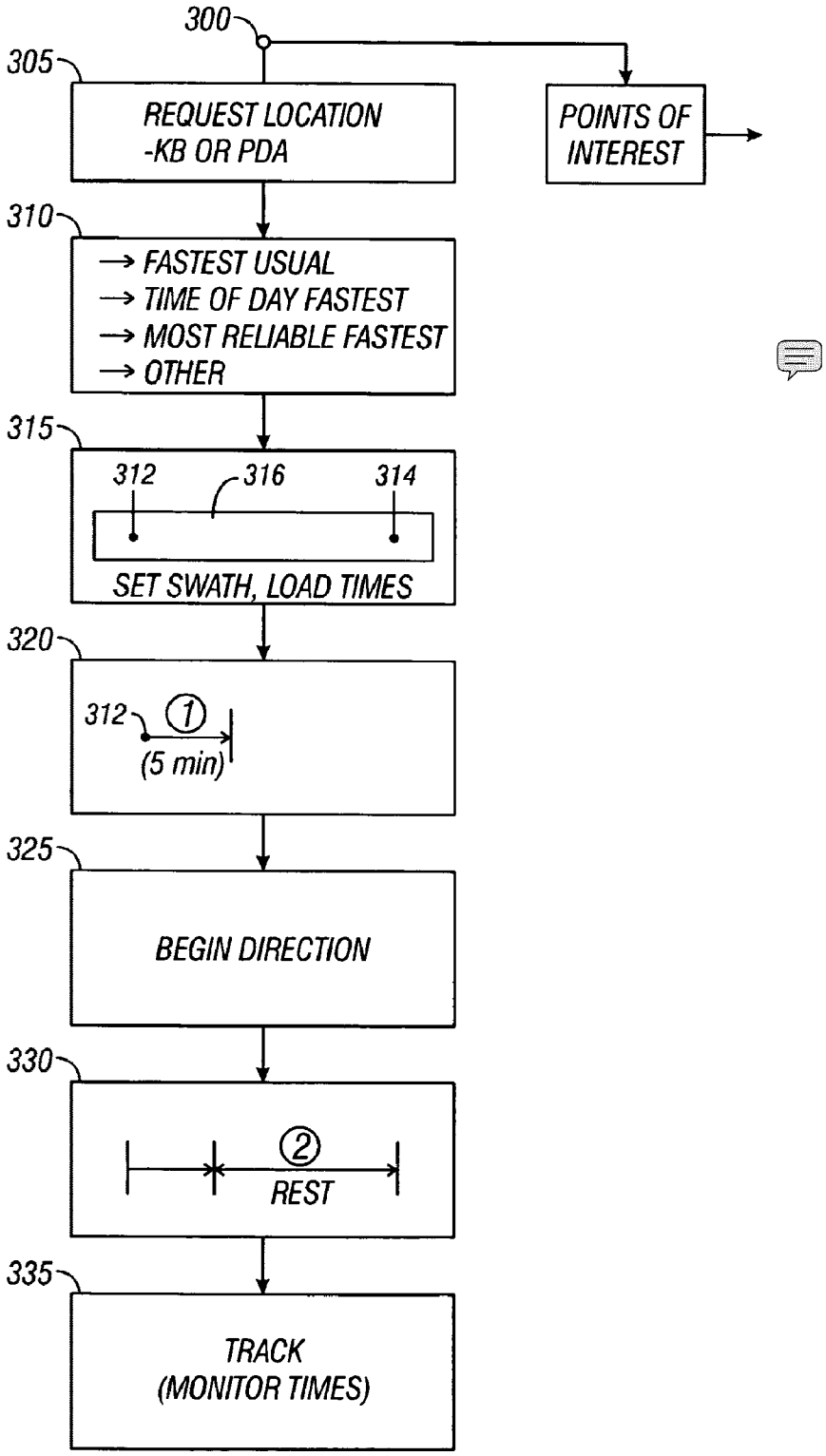

This information may change over time, and therefore frequent updates may make the system more accurate. These updates may also include additional map information. The updates may be provided in any desired form via the update module 140. The manufacturer or map issuer may charge for those updates as described above. The actual operation of the system uses the flowchart shown in FIG. 3. At 300, the user is allowed to select between a number of different operations, including requesting a mapping to a location at 305. An alternative allows the user to look for "points of interest" which is described in the flowchart of FIG. 4.

After requesting a current location, the user is presented with a number of options at 310. These may include conventional options such as shortest time, shortest distance, and least use of freeways. In addition, some enhanced options are shown as being provided. A new option includes fastest usual, which will set the route based on the fastest route which would be usual over all times. Another new option is time of day fastest, which selects the fastest route for the current time of day. This may divide the time of day generally into morning rush, evening rush, afternoon, and non Roche. Alternatively, the slices may be the sliced thinner, e.g. in one hour increments. Another new option is most reliable fastest, meaning the route that is most reliable to get one to the destination in the shortest time.

After selecting the option at 310, the system initially, at 315, selects a swath 316 around the current location 312 and the destination 314. This area 316 may be the area within which the route will be selected. At 320, the system first routes a first portion of the route, which begins at 312, and moves the user in the proper direction towards the destination. Users often do not want to wait while the system calculates the entire route from their current location to their destination. Such calculation may take minutes, and users will often not wait those minutes. This system therefore selects a relatively small part of the route e.g. the route for the next five minutes. This portion is initially calculated at 320, following by the system beginning the process of directing the user at 325. This may point the user in the right direction, while the remainder of the route is calculated at 330. After 330, the system continues the tracking and monitoring operation. This is generically shown as 335.

Figure 4:
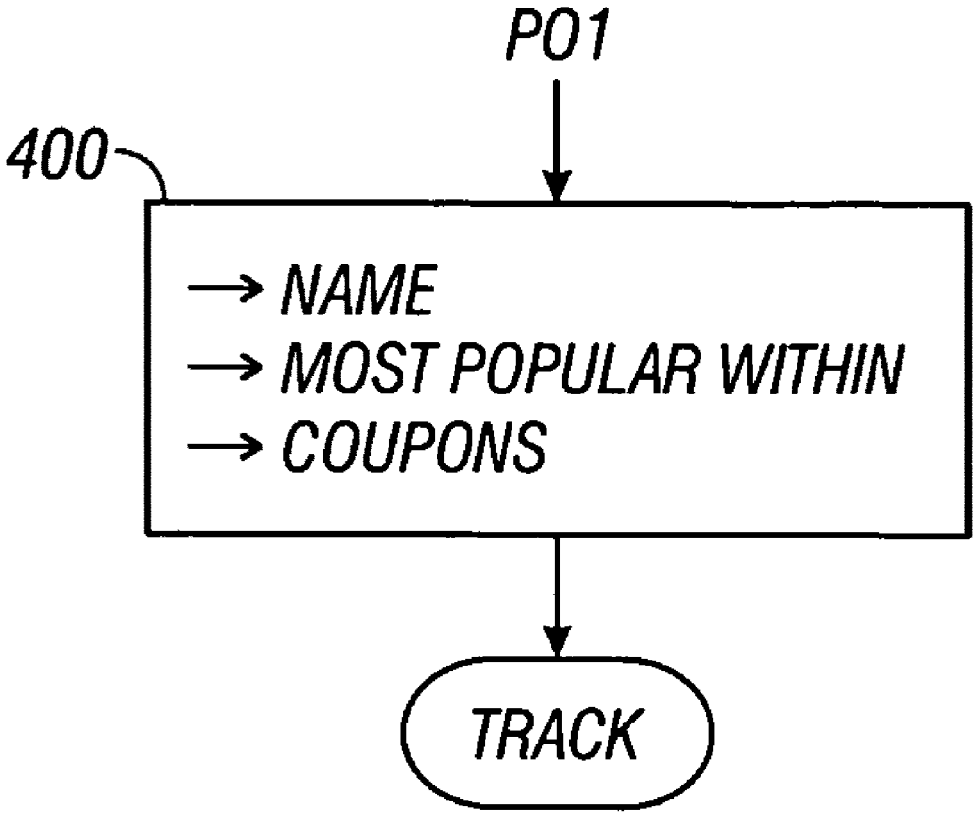
FIG. 4 shows a flowchart of finding points of interest.

FIG. 4 shows the points of interest setting. In conventional GPS units, the points of interest setting enables the user to find items close to them such as parks, restaurants, service stations. If the user is in an unfamiliar location, this may be very helpful. However, the device provides no information about which of many places to select other than name and distance/time to travel.

The present application recognizes that more frequent access usually indicates that the point of interest may be interesting. Accordingly, at 400, a new setting is provided indicating the point of interest within a specified type that is "most popular". This may indicate a point of interest that is most popular within a five-minute drive or the like. Again, this is based on monitoring other users movements, and may be used as part of an update routine.

Another aspect recognizes that many people are driven by specials such as coupons. In this embodiment, an option may provide coupons from certain points of interest. A coupon code may be provided by the processor based on information obtained during an update. For example, the coupon may be a six digit alphanumeric code that meets a specified checksum and provides a specified amount of discount at the specified location. The coupon information obtained during the update may have an expiration date, and may have a number of times that the coupon can be used.

Although only a few embodiments have been disclosed in detail above, other modifications are possible. All such modifications are intended to be encompassed within the following claims.

What is claimed is:

1. A system, comprising:

a memory, storing map information, and storing information indicative of updated actual times that were previously measured to travel different sections of roadway as of a time of an update;

a user interface, allowing entry of a destination for navigation; and a processor, computing a path to said destination based on said actual times stored in said memory.

2. A system as in claim 1, further comprising an update part which wirelessly provides said information indicative of actual times to said memory.

3. A system as in claim 1, wherein said actual times are based on measuring times taken by other users to travel said different sections of roadway.

4. The system as in claim 3, wherein said information is based on actual movements of other users at a times near a current time.

5. A system as in claim 3, wherein said movements are based on statistical movement of other users based on statistical analysis.

6. A system as in claim 3, wherein said actual data is obtained from satellite information.

7. A system as in claim 1, further comprising a remote first unit, which is separate from, but communicable with, said processor, and which allows first, entering a destination into the first unit, after said entering said destination, wirelessly transferring information from said first unit to a second unit that includes said processor, and navigating using said second unit based on information from said first unit.

8. A method, comprising:

storing map information;

storing information indicative of updated actual times that were previously measured to travel different sections of roadway as of a current time and based on an update of said updated actual times;

entering a destination for navigation; and computing a path to said destination based on said actual times stored in said memory.

9. A method as in claim 8, wherein said information includes actual times that are based on measuring travel times for said sections of roadway by of other users.

10. The method as in claim 8, further comprising obtaining said information by monitoring actual movements of other users at times close to a current time.

11. A method as in claim 8, further comprising obtaining said actual data from satellite information.

12. A method as in claim 8, wherein said entering a destination comprises entering the destination into a remote first unit, which is separate from, but communicable with, a second unit that carries out said computing, and after said entering said destination, wirelessly transferring information from said first unit to said second unit and navigating using said second unit based on information from said first unit.

13. A method as in claim 8, further comprising producing a special display when the navigation system has not obtained enough information to determine its current position.

14. A method, comprising:

obtaining current information about travel conditions in an area, said information including current information about multiple different travel routes;

determining a route between a starting area and an ending area using said current information about multiple travel route, thereby mapping based on actual travel route conditions, wherein said mapping determines a fastest time between said starting area and said ending area, based on actual times that other users have taken to go between points on routes.

15. A method as in claim 14, further comprising updating said actual time to obtain real time data.

16. A method, comprising:

first, entering a destination into a first unit;

after said entering said destination, transferring information from said first unit to a second unit that is capable of navigation operations; and navigating using said second unit based on information from said first unit;

wherein said first unit and said second unit are completely separate units which communicate wirelessly with one another.

17. A method as in claim 16, wherein said wireless connection is an infrared connection.

18. A method as in claim 16, wherein said first unit is a PDA, and said second unit is a GPS navigator.

19. A method, comprising:

using a navigation system which wirelessly obtains information indicative of its position; and producing a special display when the system has not obtained enough information to determine its current position.

20. A device as in claim 19 wherein said producing comprises producing a first color to indicate confidence in said information, and a color to indicate lack of confidence in said information.

* * * * *